Patented July 14, 1953

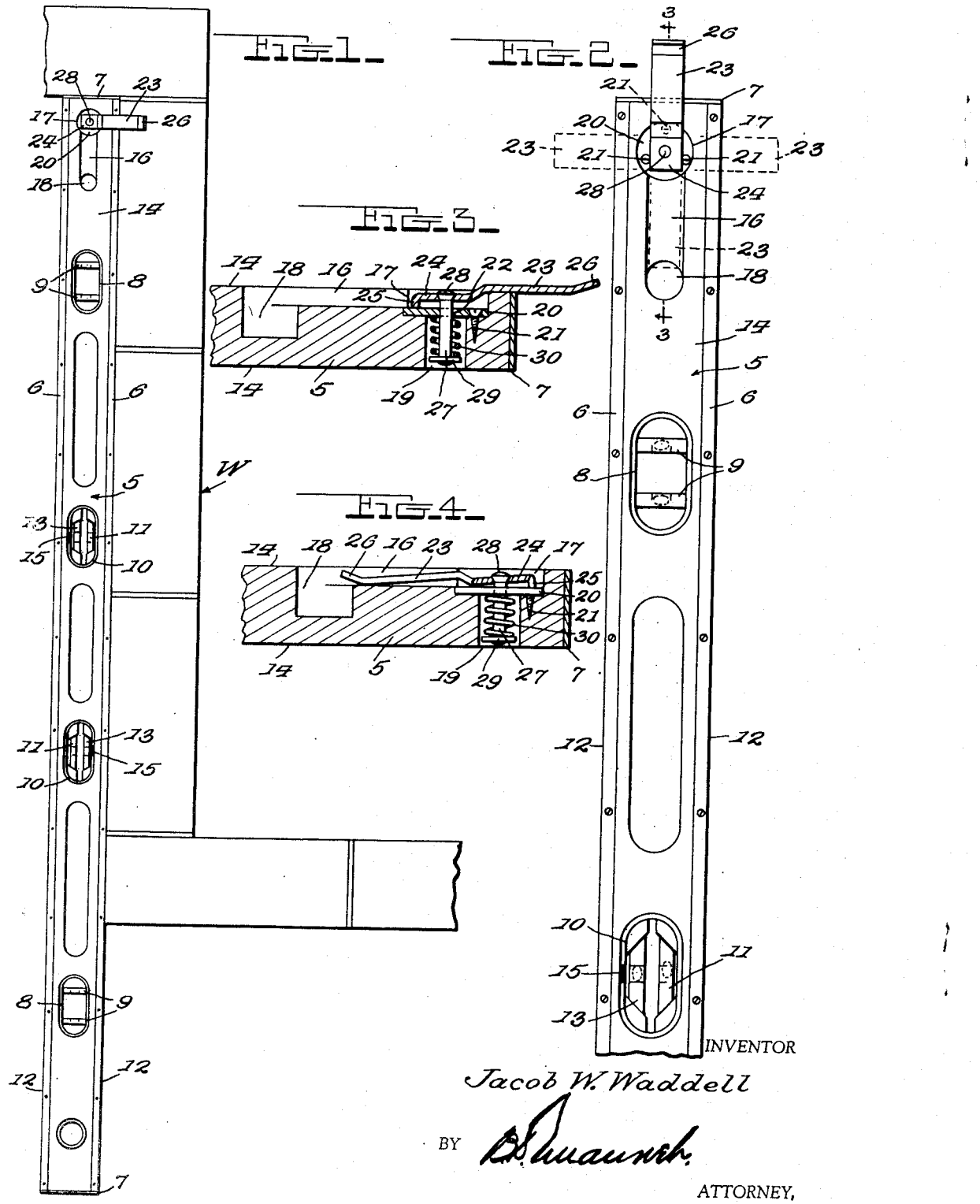

2,645,018

UNITED STATES PATENT OFFICE 2,645,018

MASON'S LEVEL

Jacob W. Waddell, Waverly, Ohio

Application August 30, 1951, Serial No. 244,353

3 Claims. (Cl. 33—85)

This invention relates to a new and improved level for use by masons in erecting walls from cement or cinder blocks, tiles, or bricks.

In using a level upon the upper side of any tier of a wall being erected, it frequently happens that the level will rock or teeter due to imperfections in the blocks or the like or inaccuracies in laying, making it impossible to accurately determine whether said tier is level. The present invention, however, is designed to overcome this difficulty by providing an improved level which may be conveniently and effectively used against the inner or outer side of any tier to accurately determine whether this tier is level and at the same time to show whether the blocks or the like are properly alined.

In using the level as above stated, it must occupy a horizontal position no higher and no lower than the plane of the upper side of the tier, and a further object of the invention is to provide the level with a projectable finger to lie upon the tier and aid materially in properly positioning said level, said finger being movable to a retracted out-of-the-way position when its use is not required.

A still further object of the invention is to so mount the projectable and retractable finger that it may be projected longitudinally from one end of the level or laterally from the latter, as may be most convenient.

When using the improved level, as above explained, against the inner or outer side of a tier, it is preferable to have one of the usual straight edges of said level disposed against said inner or outer side of the tier. A still further object therefore is to mount the above mentioned finger at one flat side of the level, disposing this flat side upwardly when using the level with the finger projected.

With the level in the position just mentioned, the usual longitudinal bubble tube or tubes would in most cases be inaccurate, as said tube or tubes are mounted to be accurate only when one edge of the level is presented upwardly. Another object therefore is to provide the level with one or more additional bubble tubes, easily identified and mounted to be accurate when using the level with one side presented upwardly and one edge disposed against the inner or outer side of a tier.

Yet another object is to provide a simple and inexpensive construction in which the above mentioned finger is pivotally mounted and is spring-moved into a recess in the level body when it is swung to retracted position, said finger being easily movable from said recess and projectable for use.

With the above and other objects in view that will become apparent as the nature of the invention is better understood, the same consists in the novel form, combination and arrangement of parts hereinafter more fully described, shown in the accompanying drawing, and claimed.

In the drawing:

Figure 1 is a top plan view showing one manner of using the improved level,

Figure 2 is an enlarged side elevation showing the finger projected longitudinally in full lines and laterally in dotted lines, Figure 3 is an enlarged detail longitudinal sectional view on line 3—3 of Figure 2, and Figure 4 is a view similar to Figure 3 but partly in elevation, showing the finger in its retracted not-in-use position.

Preferences have been shown in the drawing and will be rather specifically described, but variations may of course be made within the scope of the invention as claimed.

The elongated body 5 may be of a conventional size and of either wood or metal. When of wood, its edges and ends may be reinforced by metal as shown at 6 and 7 respectively. Near its ends the body 5 is formed with the usual openings 8 in which transverse bubble tubes 9 are mounted for use when using the level to plumb a wall or structural member. The intermediate portion of the body 5 is formed with openings 10 in each of which a longitudinal bubble tube 11 is mounted, these tubes being usable when the level is used in a conventional manner with one or the other of its edges 12 presented upwardly and the other downwardly. In each of the openings 10 there is also a bubble tube 13 mounted to be accurate when the level is used in accordance with this invention, that is, with one of the flat sides 14 presented upwardly and the other downwardly. The bubble tubes 13 may be of some conspicuous color to make them readily identifiable, or they may be identified by bright colored spots 15 at the edges of the openings 10. All of the openings in which the bubble tubes are mounted, are preferably glass covered, or provided with covers of transparent plastic.

The body 5 is formed with a longitudinal shallow recess 16 at one end and opening through one of the flat sides 14. The outer end of the recess 16 is preferably enlarged at 17 and the inner end of said recess is deepened as at 18. An opening 19 extends from the enlarged end 17 to the opposite side of the body 5. A plate 20 is secured against the bottom of the enlarged recess end 17, by means of screws 21, said plate being disposed in a plane parallel with the sides 14 of the body 5. This plate is formed with a central opening 22 alined with the opening 19.

An elongated metal finger 23 is normally disposed longitudinally within the recess 16 as seen in Figure 4. This finger 23 is provided with an inwardly offset inner end portion 24, the extremity 25 of which is bent inwardly and contacts with the outer side of the plate 20, constituting a rocker. The end portion 24 of the finger is located within the enlarged recess end 17 and the other end 26 of said finger is bent obliquely outward and extends over a portion of the deepened recess end 18. A pivot pin 27 is loosely connected at 28 with the offset end 24 of the finger 23 and extends slidably through the opening 22 into the opening 19. This pin is provided with an abutment 29 within the opening 19 and a coiled compression spring 30 is interposed between this abtument and the plate 20. The spring 30 normally holds the finger 23 within the recess 16 in the tilted position shown in Figure 4. However, when the user inserts the tip of one of his fingers into the deepened socket end 18, he may engage the end 26 of the finger 23 and thus outwardly tilt this finger until all but its offset end 24 is out of the recess 16. He may then swing the finger 23 to a position in which it will rest horizontally upon the uppermost of the body sides 14 and project beyond the body 5 for use. The finger 23 may be positioned to project beyond the end or either edge of the body 5 as will be clear from Figures 1 and 2. When the finger 23 is again swung inwardly after use, the spring 30 snaps it to its normal out-of-the-way position within the recess.

When the finger 23 occupies a projected position, it aids materially in properly positioning the level with one of its edges 12 against the inner or outer side of a tier of blocks or the like, and with one of its flat sides 14 presented upwardly and flush with the upper side of said tier. When this is done, the level is read by looking at one or the other of the bubble tubes 13. In Figure 1 a wall shape W is shown which would permit the finger 23 to function whether extended either laterally or longitudinally but other wall shapes will necessitate that the finger be set in one position only in order to be effective.

From the foregoing detailed description of the invention, it is believed that the construction, use, and operation thereof will at once be apparent, and while there is herein shown and described the preferred embodiment of the invention, it is nevertheless to be understood that minor changes may be made therein without departing from the spirit and scope of the invention as claimed.

I claim:

1. In a mason's level, an elongated body provided with at least one straight longitudinal edge and at least one flat side, said flat side being in a plane at a right angle to the plane of said edge, said body having a shallow recess near one end and opening through said flat side, said recess being elongated longitudinally of said body, said body also having a transverse opening extending from the outer end portion of said recess toward the opposite side of the body, a plate secured in said outer end portion of said recess and disposed in a plane parallel with and spaced inwardly from said flat side, said plate having a relatively small opening communicating with said transverse opening of said body, a finger normally disposed within said recess and having an inwardly offset inner end portion adjacent the outer side of said plate, the terminal of said offset end portion having a rocker projecting inwardly against said outer side of said plate, a pivot pin loosely connected with said offset end portion of said finger, said pivot pin extending slidably through said relatively small opening of said plate into said transverse opening of said body, and spring means in said transverse opening, said spring means being connected with said pivot pin and exerting a longitudinal stress upon said pin, to normally tilt said finger inwardly about said rocker to a confined position within said recess, said finger being manually tiltable outwardly against the action of said spring means and being then swingable about said pivot pin to a position in which said finger projects beyond said body.

2. A structure as specified in claim 1; said spring means being a coiled compression spring surrounding said pivot pin and at one end abutting said plate, said pivot pin having an abutment against which the other end of said spring abuts.

3. A structure as specified in claim 1; said recess having a deepened inner end, the free end of said finger normally projecting partially over said deepened recess end, said deepened end being of such size that the tip of a human finger may be inserted into it to engage said free end of said finger and tilt the latter outwardly.

JACOB W. WADDELL.

References Cited in the file of this patent

UNITED STATES PATENTS

| Number | Name | Date |
|---|---|---|
| 935,038 | Lynch | Sept. 28, 1909 |
| 1,489,239 | Eagan | Apr. 8, 1924 |
| 1,855,394 | Hill | Apr. 26, 1932 |

FOREIGN PATENTS

| Number | Country | Date |
|---|---|---|
| 298,323 | Great Britain | Oct. 11, 1928 |